Figure 1:
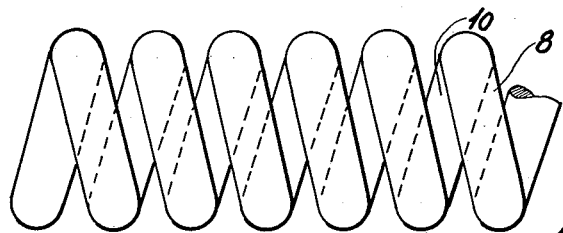

March 7, 1961 H. HANSEN 2,973,554
METHOD AND APPARATUS FOR USE IN THE PRODUCTION
OF A HELICAL ROW OF COUPLING LINKS
Filed Sept. 27, 1957 3 Sheets-Sheet 1

INVENTOR
Harry Hansen

BY
Watson, Cole, Grindle + Watson
ATTORNEY

March 7, 1961 H. HANSEN 2,973,554
METHOD AND APPARATUS FOR USE IN THE PRODUCTION
OF A HELICAL ROW OF COUPLING LINKS
Filed Sept. 27, 1957 3 Sheets-Sheet 2
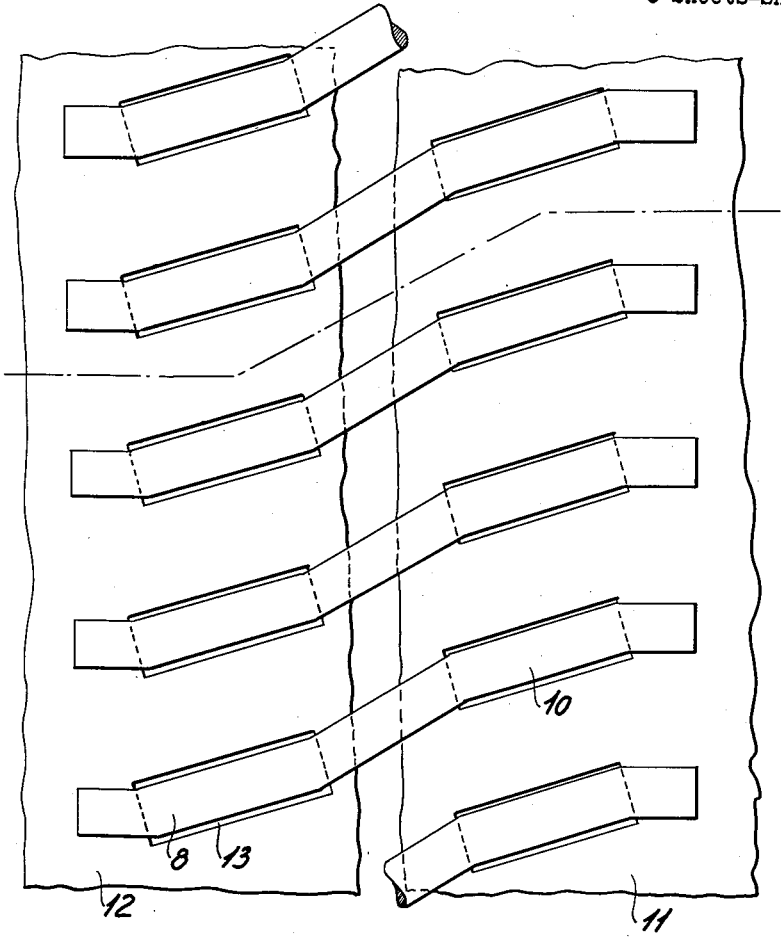
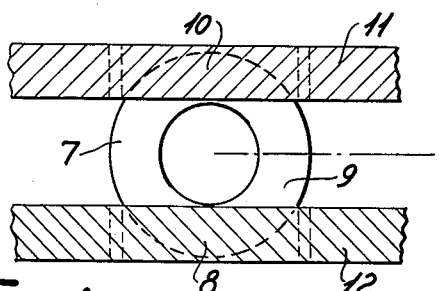
INVENTOR
Harry Hansen
BY
Watson, Cole, Grindle & Watson
ATTORNEYs

United States Patent Office 2,973,554
Patented Mar. 7, 1961

2,973,554
METHOD AND APPARATUS FOR USE IN THE PRODUCTION OF A HELICAL ROW OF COUPLING LINKS

Harry Hansen, 14 Hoffdingsvej, Valby (Copenhagen), Denmark

Filed Sept. 27, 1957, Ser. No. 686,685

Claims priority, application Denmark Oct. 2, 1956

6 Claims. (Cl. 18—19)

This invention relates to a method and apparatus for use in the production of a slide fastener of the type in which at least one of the rows of coupling links consists of a coiled or helical filament. Slide fasteners of this type have become of particular interest in connection with the use of modern plastics such as nylon for the production of the rows of coupling links, and they have certain advantages over slide fasteners with rows of coupling links composed of individual links, both as regards the process of production and as regards certain properties of the finished slide fastener such as lightness and elegance. In most cases, both rows of coupling links consist of coiled filaments, the turns of which engage with one another, but slide fasteners are also known in which a coil engages with cut out bands or rows of coupling links composed of individual elements, and a construction has also been proposed by the applicant in which one row of coupling links consists of a coil, while the other row consists of a continuous filament shaped in the form of a serpentine, as in patent application No. 592,915, now Patent No. 2,907,088.

The invention relates to a method for use in the production of a coiled row of coupling links for slide fasteners of the above mentioned general type. One of the problems presenting itself in the production of such rows of coupling links is to obtain accurate matching of the two rows of coupling links in one side and the other respectively of a slide fastener. This problem has been solved according to a previous proposal by winding the two rows of coupling links in the same machine and in some cases even simultaneously. However, this solution cannot be used when the coiled row of coupling links is to engage with another form of a coupling link, and even in slide fasteners where both rows of coupling links consist of coils, it will be of advantage from the point of view of manufacture if the coils can be taken indiscriminately from different machines.

Therefore, the problem arises of producing a helical row of coupling links, which has a predetermined, very accurately defined total rise of each turn. This will also be of advantage with a view to subsequent operations such as the attachment of the row of coupling links to a stringer by sewing. A difficulty is, however, that the material used in most cases is to some degree plastic and elastic.

According to the present invention, in order to solve this problem, the turns of the coil are held in engagement with spacing jigs while being stabilized in their shape by heating and subsequent cooling.

In this manner it has been found possible to obtain a very great accuracy and constancy of the total rise per turn as measured over even very great lengths of the coil, so that no difficulty is encountered in assembling a row of coupling links produced in this manner with a row of coupling links of the same type or a different type produced in a different machine, and also it is possible without difficulty to perform the sewing with a feeding movement that is not controlled by the turns of the coil themselves.

According to a preferred method of carrying out the invention, the coil while engaged with the spacing jigs is moved together with the engaging pattern of the latter along a mandrel on which the coil is continuously wound at one end and from which it is continuously discharged at the other end. In this manner the whole production of the coil inclusive of the stabilization thereof by heating and recooling can be performed in a continuous process.

A special advantage of the described method is that it becomes possible without any complications of the operation to obtain a non-uniform angle of pitch within each turn of the coil, and in such a manner that the non-uniformity will be exactly the same in each of the turns so that all of the turns have the portions thereof with the smallest angle of pitch, which may be zero or even negative, facing the same way. This can be obtained simply by displacing the spacing jigs relative to one another.

The invention also comprises an apparatus for carrying out the described method. According to the invention, this apparatus comprises in combination a stationary mandrel, rotatable means for winding a filament around said mandrel in such a manner that the resulting coil is moved forward along the mandrel gradually as it is formed, endless spacing jigs adapted to engage with the turns of the coil along part of the mandrel and to form an engaging pattern travelling along the latter at a speed corresponding to the rate of formation of the coil, and means for heating and cooling the coil while moving along the mandrel.

In a preferred embodiment, the spacing jigs are adjustable in such a manner as to produce a varying angle of pitch within each convolution. By arranging the spacing jigs to be adjustable, it is possible at any time to perform an after-adjustment of the shape of the turns of the coil, e.g. based on the inspection of finished slide fasteners in which the helical rows of coupling links made by means of the apparatus are assembled with rows of coupling links produced in a different machine.

In practice it has been found sufficient and preferable to use two spacing jigs located on opposite sides of the mandrel.

A particularly suitable form of a spacing jig is an endless band with slots for engagement with the turns of the coil. Since the angle of pitch of these slots can be selected at will, it is possible in this manner to adjust the variation of pitch within each individual turn exactly as required with a view to the properties of the finished slide fastener.

The invention will now be described in further detail with reference to the accompanying drawing, in which Fig. 1 diagrammatically shows one form of a helical row of coupling links for a slide fastener that may be produced by means of the method and apparatus according to the invention, Fig. 2 the same as viewed in the direction of the plane of the slide fastener from the middle of the slide fastener, Fig. 3 a perspective view of a single turn of the helical row of coupling links, Fig. 4 a diagrammatic illustration of the helical row of coupling links in engagement with spacing jigs in one stage of its production, as viewed in a section perpendicularly to the longitudinal direction of the row of coupling links and the spacing jig, Fig. 5 a diagrammatic representation of the coiled row of coupling links and the spacing jigs, and Fig. 6 a diagrammatic illustration of one form of a machine according to the invention, in side view.

The example of a row of coupling links illustrated in

Figure 2:
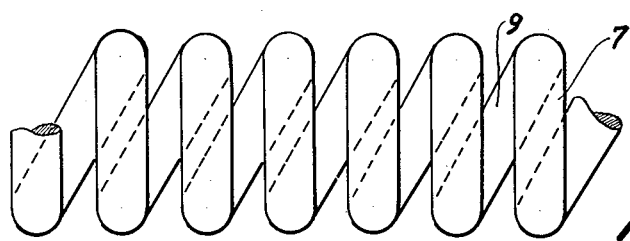
Figure 3:
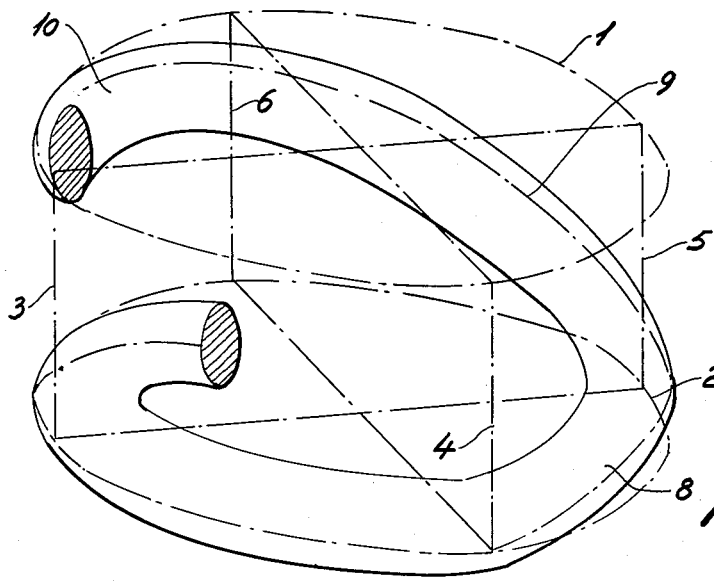

Figs. 1–3 consists of a coil, the turns or convolutions of which are all exactly identical, but each being constructed with varying angle of pitch. The manner, in which this angle of pitch varies within each individual turn, is best understood by reference to Fig. 3. The geometrical cylindrical surface, on which the helix is formed is represented in this figure by two circles 1 and 2 at a mutual distance corresponding to the total rise of the helix per turn, and four generating lines 3, 4, 5 and 6 spaced at 90° from one another. When following the convolution illustrated, it will be seen that from the generating line 3 to the generating line 4 it has a front portion 7, in which the angle of pitch is zero or practically zero. This is the part of the convolution—also indicated in Fig. 2—which is intended for engagement with the other row of coupling links of the slide fastener. From the generating line 4 to the generating line 5 follows a flank portion 8 having an angle of pitch of e.g. 15°, see also Fig. 1. From the generating line 5 to the generating line 6 then follows the back portion 9, see also Fig. 2, having an angle of pitch of e.g. 30°, and finally there follows, from the generating line 6 to the generating line 3, another flank portion 10, see also Fig. 1, having the same angle of pitch as the flank portion 8, i.e. e.g. 15°.

The angular zones covered by the different portion of the convolutions, as well as the angle of pitch within each such zone may of course be varied as desired, but preferably the convolution should have a front portion, the angle of pitch of which is zero or at least very small as illustrated, or even negative. The advantage of this arrangement is that a better engagement with the coupling links of a counter row of coupling links is obtained, which is particularly the case when the latter row of coupling links is in the form of a serpentine, as set forth in patent application No. 592,915, now Patent No. 2,907,088.

One method, by which a coiled row of coupling links may be shaped as desired, while at the same time obtaining a very great accuracy of the total rise or in other words the average angle of pitch, is illustrated in Figs. 4 and 5. In these figures, 11 and 12 represent two spacing jigs, which are in the form of bands with inclined and if desired slightly curved slots 13, in which the turns of the coil engage. In Fig. 4, which is purely diagrammatic, the two bands are illustrated side by side instead of opposite one another, and each turn of the coil is represented as being broken off separately and unrolled. The term spacing jig as used in the present specification is intended to mean any member, which is capable of keeping the turns of a coil accurately and uniformly spaced.

In the form of the spacing jig illustrated in Fig. 4, the slots 13 serve for the engagement of the portions of the turns indicated by 8 and 10 in Fig. 3. As is seen in Fig. 5, the upper end of each of the slots 13 of the band 11 is in level with the lower end of a slot 13 of the band 12, so that the turn portion 7 with the angle of pitch zero or practically zero is formed at the free distance between these two slot ends. Similarly, the turn portion 9 with great angle of pitch is formed at the free distance between the two opposite slot ends.

Now, according to the invention, while the coiled row of coupling links is in engagement with the spacing jigs as described, the row of coupling links is subjected to heating and re-cooling so as to be stabilized in the desired shape in which it is kept between the spacing jigs. In this manner, not only the desired variation of pitch within each individual turn, but also the total pitch is stabilized.

By displacing the bands 11 and 12 relative to one another and by selecting a suitable inclination of the slots 13, the variation of pitch within each individual turn may be selected in any desired manner, also if desired in such a manner that there will be a uniform pitch within each individual turn if this form is considered satisfactory for some use of the coiled row of coupling links.

Figure 6:
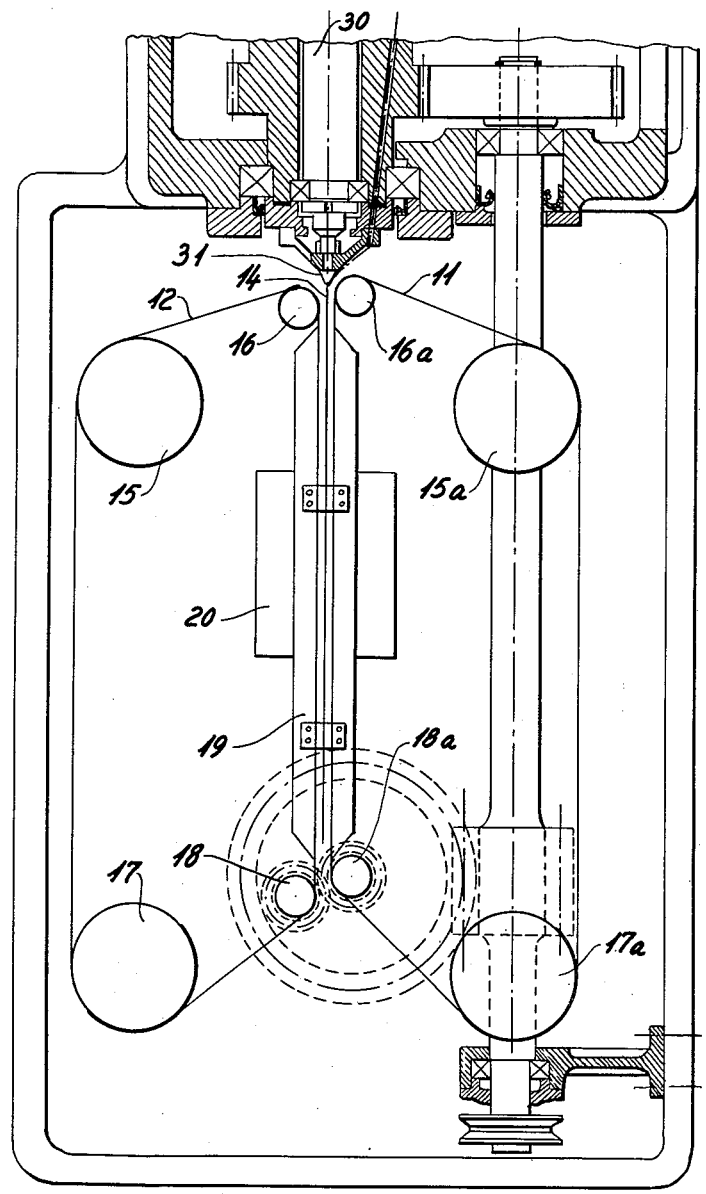

A machine, by means of which the described method can be carried out, is diagrammatically illustrated in Fig. 6. In this figure, 14 is a stationary mandrel suspended from a stationary shaft 30, and around the upper end of which a filament is wound by means of a rotatable nozzle 31, the detailed construction of which does not form part of the present invention, but is fully described in my Danish patent application No. 4430/56. In this manner, the filament is made into a coil that pushes downward along the mandrel gradually as it is formed. When it has proceeded a little distance down the mandrel, it is caught between two endless bands corresponding to the bands 11 and 12 in Figs. 4 and 5 and therefore denoted by the same reference characters. The endless bands 11 and 12 are guided over rolls 15, 15a, 16, 16a and 17, 17a and have a run extending along the mandrel 14, at the lower end of which the bands engage with synchronized sprockets 18 and 18a respectively serving to pull the bands down along the mandrel. The sprockets 18 and 18a are rotatably adjustable relative to one another, so that the bands 11 and 12 can be displaced relatively to one another. The mandrel and the runs of the bands 11 and 12 are surrounded by a bipartite casing 19, which is provided with heating means 20 e.g. in the form of electrical resistance heating elements.

The operation is as follows: Shortly after the turns of the coil have been formed, they are caught between the bands 11 and 12, which serve as spacing jigs, and are held in engagement with the latter while they push down along the mandrel 14, whereby the turns are kept in the desired shape and correct spacing during the whole of this passage. When the turns pass the zone, in which the heating means 20 are arranged, they are heated and during their further passage they are again cooled. By this process, they are stabilized in the shape in which they are held between the spacing jigs. After having been stabilized in this manner, the finished coil is discharged from the lower end of the mandrel 14.

It will be understood that the spacing jigs may be constructed to shape the front and back portions of the turns instead of their flank portions.

I claim:

1. A method of producing a coiled row of coupling members for a slide fastener which comprises the steps of winding a continuous filament onto one end of a mandrel, continuously moving the resulting coil along said mandrel, moving a plurality of endless bands longitudinally of said mandrel and synchronously with the formation of the coil thereon, engaging each turn of said coil individually with engaging means of said endless bands and maintaining said turns in a predetermined shape in a predetermined positively controlled pitch relationship by said engagement as said coil is moved along said mandrel, then removing said coil continuously from said endless bands at the other end of said mandrel, and mutually displacing said endless bands to create a variation of angle of pitch within each turn of said coil.

2. Apparatus for use in producing a coiled row of coupling members for a slide fastener comprising a stationary mandrel, rotatable means for winding a filament around said mandrel and moving the resulting coil gradually forward along said mandrel, endless bands having runs extending longitudinally of said mandrel, spacing means on said endless bands positioned to individually engage each turn of said coil in a plurality of points and maintain same in a predetermined shape and in a relationship with the remaining turns in said coil as the latter is moved along said mandrel, and means for moving said endless bands longitudinally of said mandrel and synchronously with said rotatable winding means.

3. Apparatus for use in the production of a coiled row of coupling links for a slide fastener comprising a stationary mandrel, rotatable means for winding a filament around said mandrel and moving same forwardly along the length of said mandrel, a plurality of endless bands, each of said bands having a run extending along the length of said mandrel and including a plurality of spaced transverse slits for engagement with the turns of the coil, and means for moving said endless bands synchronously with said rotatable means.

4. Apparatus according to claim 3, in which means are provided for adjusting the mutual phase relationship of said endless bands.

5. Apparatus according to claim 3, in which two endless bands are provided located on opposite sides of the mandrel.

6. Apparatus according to claim 3, in which means are provided for heating and re-cooling the coil while moving along the mandrel.

References Cited in the file of this patent

UNITED STATES PATENTS

| | | |
|---|---|---|
| 2,541,729 | Wahl | Feb. 13, 1951 |
| 2,545,271 | Gartner | Mar. 13, 1951 |
| 2,718,914 | Nagel | Sept. 27, 1955 |
| 2,740,987 | Moncrieff | Apr. 10, 1956 |
| 2,878,514 | Nichols et al. | Mar. 24, 1959 |